United States Patent [19]

Gorman, Jr. et al.

[11] 4,231,992
[45] Nov. 4, 1980

[54] THREE-PHASE COUNTER-DOUBLE-CURRENT APPARATUS

[75] Inventors: William W. Gorman, Jr.; Esther M. Gorman, both of St. Petersburg, Fla.

[73] Assignee: E-C Apparatus Corporation, St. Petersburg, Fla.

[21] Appl. No.: 66,362

[22] Filed: Aug. 14, 1979

[51] Int. Cl.³ .............................................. B01D 11/04
[52] U.S. Cl. .................................... 422/258; 422/256
[58] Field of Search ............... 422/256, 257, 258, 260; 196/14, 52

[56] References Cited

U.S. PATENT DOCUMENTS

| Re. 25,186 | 6/1962 | Raymond | 422/258 X |
| 2,892,688 | 6/1959 | Buchler | 422/256 X |
| 2,903,342 | 9/1959 | Buchler | 422/256 |
| 2,990,254 | 6/1961 | Winter et al. | 422/256 |
| 3,189,414 | 6/1965 | Beau | 422/256 X |

Primary Examiner—William A. Cuchlinski, Jr.
Attorney, Agent, or Firm—Sughrue, Rothwell, Mion, Zinn and Macpeak

[57] ABSTRACT

A counter-double-current device having an array of interconnected tube elements, each of the elements having a mixing tube, a light phase decant tube and an intermediate phase decant tube. The light and intermediate phase decant tubes are disposed parallel to the mixing tube with the intermediate phase decant tube positioned between the light phase decant tube and the mixing tube. A first juncture tube joins the mixing tube and light phase decant tube while a second juncture tube joins the light and intermediate phase decant tubes. First and second downspout tubes are sealably mounted within the lower portions of the two decant tubes. The first downspout tube extends into the light phase decant tube from its lower portion to a distance which defines a volume between the inner surface of the light phase decant tube and the outer surface of the first downspout tube equal to the combined volumes of the heavy and intermediate phases while the second downspout tube extends into the intermediate phase decant tube by a distance so as to define a volume equal to the volume of the lower phase. The downspout tube extending into the light phase decant tube is connected to the lower portion of the mixing tube of an adjacent element on one side of the array while the downspout tube which extends into the intermediate phase decant tube is connected to the mixing tube of an adjacent element on the opposite side within the array.

10 Claims, 13 Drawing Figures

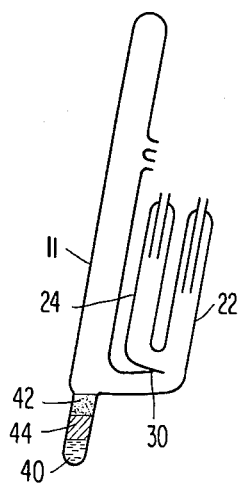
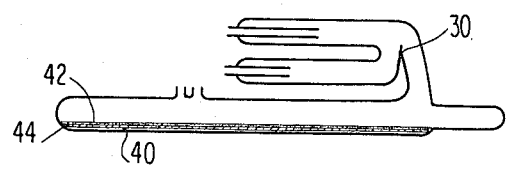
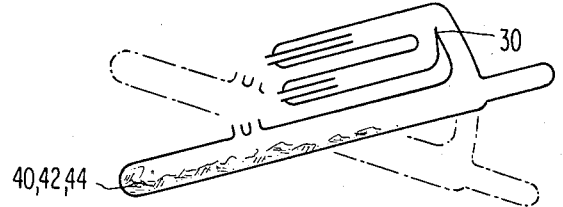
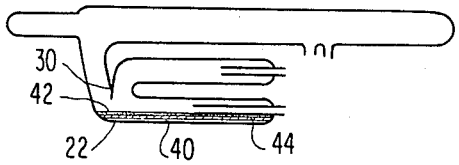
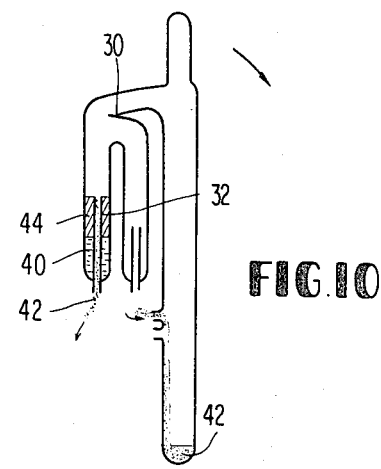
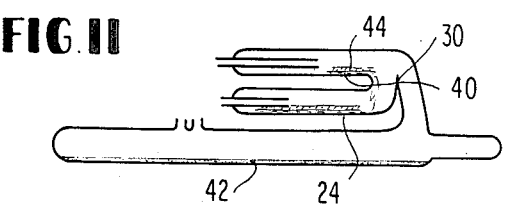
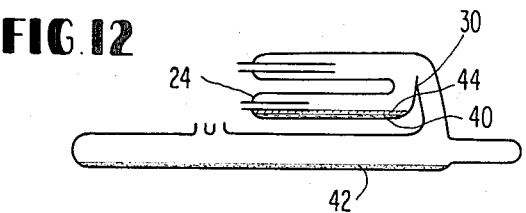
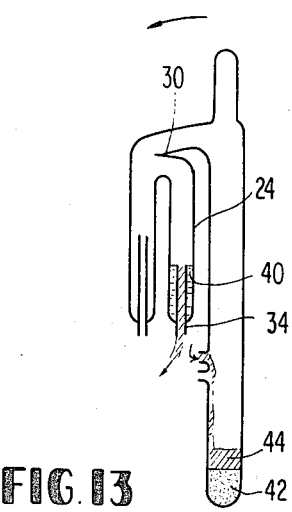

THREE-PHASE COUNTER-DOUBLE-CURRENT APPARATUS

BACKGROUND OF THE INVENTION

The invention relates to apparatus for mixing and subsequently separating immiscible or semi-immiscible fluids, particularly liquid solvents, for transferring a solute from one fluid to the other. The three liquids are termed the light, intermediate and a third phase variously termed the lower, residual, heavy or stationary phase.

Techniques of extraction for separation of materials have been the subject of much experimentation. It is well established that conventional funneling techniques will not, on a single extraction pass, suffice for the separation of similar substances. Within this technology, a technique, "countercurrent distribution" (CCD), has been developed to utilize small differences in partitioning properties for purification purposes by repetitive contacting extraction passes. A hallmark of CCD is that the distribution of solute in the train can be mathematically predicted, thereby providing a model for defining the purity of the isolated product. The theory is set forth in King and Craig, "Countercurrent Distribution," Methods of Biochemical Analysis, Volume 10, page 201.

Devices built for CCD usually consist of a series of interconnected glass tubes so configured that in each tube an upper (light) phase can be mixed with a lower (residual) phase, allowed to separate from the lower phase and then automatically transferred to the next tube in the series while leaving the lower phase behind. These devices operating on a stepwise transfer basis allow precise fractionation of complex mixtures even in cases where only small amounts of material are available.

As indicated in a CCD train, only one phase, usually the upper phase, is transferred, and the other remains stationary in each element of the train. An important modification of CCD has been developed in which both phases move at a predicated and controlled rate through the train. This is known as "counter-double-current distribution" (CDCD). This technique is important because it allows a fresh portion of the sample to be introduced at a central point in the array on each transfer. CDCD mathematical distribution theory has been reported in Post and Craig "A New Type of Stepwise Countercurrent Distribution Train," 35 Anal. Chem. 641 (1963). In CDCD, two distribution techniques are available: (1) upper stage transfer in one direction on every other equilibration stage while lower stage transfer takes place in an opposite direction on intervening transfers; and (2) both stages are transferred to an adjacent tube, in opposite directions on each equilibration.

Within the prior art, a variety of such devices have been reported which are used for CCD or CDCD solvent phase extraction. Typical are U.S. Pat. Nos. 2,892,688, 2,895,808 and 2,973,250. Additionally, the technical literature is replete with reports of experimental devices used in a CCD mode. Typical are Gaucher, "An Introduction to Chromatography," Volume 46, J. Chem. Ed. 729 (1969); Alderweireldt, "New Instrument for Continued Batch Wise Separation by Extraction," Analytical Chemistry 30, 1290 (1961); and Hietala, "A Counter-Current Distribution Method," Ann. Acad. Scient. Fennicae, A.I.I. 100 at page 13.

More pertinent prior art appears in the Post and Craig article, which shows an apparatus utilizing the technique practicing the first technique of CCD set forth above using side-arm decantation of the upper phase. This technique, however, leads to co-flow. This type of system has not achieved wide commercial success because the tubes of the apparatus are individually constructed, which require a large number of joints. By having so many joints between system components, the propensity for leakage is increased. Also, the device of Post and Craig requires operation in two directions, therefore, necessitating a complicated drive train.

A device which has achieved a commercial success in the practice of CCD is described by Raymond, "Compact Counter Current Distribution Apparatus,": Analytical Chem. 30, 1214 (1958). This device is also explained in detail in U.S. Pat. No. Re. 25,186 (Re. 25,186) to Raymond.

The Raymond device shows best in FIGS. 1 and 2 a system which is mounted for rotation about bearing 19 having a number of mixing and separating elements 14. The elements are constructed as common elements individually shown in FIGS. 2 and 5. Each of the elements contains a mixing phase tube 34 and a phase separating tube 35. The tubes are coupled by a common bifurcated juncture 36 shown best in FIG. 3. Shown in FIG. 3, the mixing tube has a closed end 37 with a cap 38, and an effluent phase entrance tube couples the tube 34 to the phase separating tube 35 via down spout 51.

In operation of the Raymond device, each of the elements 14 are filled with a predetermined amount of lower (residual) phase material equal to the volume which can be retained between the down spout element 51 and the lower septum wall 50. This is generally known as the critical volume. A quantity of the effluent or upper phase is introduced generally, while the elements are in the horizontal position with the reservoir 49 disposed upwardly. The quantity of the effluent phase is not critical but limited only to the capacity of the mixing tube 34. Operation commences with the phase separating tube 35 disposed above the mixing tube 34 with the elements 14 rocked to thoroughly mix the effluent and residual phases. The elements are then rotated 180° into the position shown in FIG. 4 of the Raymond device such that the intermixed contents are allowed to flow into the separating tube 35. Because of the relatively large area of the separating phase tube, separation occurs, and a quantity of the effluent phase may enter the down spout 51. However, none of the critical residual phase will be drained.

The 90° rotation then takes place with the residual phase trapped in the reservoir 49, as shown in the Raymond patent, and the separated effluent phase will pass through the down spout 51 into the drain tube 53 with this action. The effluent phase is deposited in the next adjacent element 14 so that on the next rotational cycle the second extraction can be performed.

In the above-mentioned U.S. Pat. No. 2,892,688 to Buchler there is disclosed a mixing and separating device in which the tubes are interconnected in a cascade arrangement. It does not appear possible to arrange the tubes in a parallel bank. Moreover, in this arrangement, it does not appear possible to retain either of the mobile phases for mixing to carry out conventional countercurrent fractionation with two stationary phases and one mobile phase. A similar device is disclosed by Meltzer, "Three-phase Counter Current Distribution: Theory And Application To The Study of Strandin", Anal. Chem. 30, 1290 (1961).

Similarly, the device disclosed by Wilhelm and Foos, "A Counter Current Liquid-Liquid Extractor", Ind. Eng. Chem. 51, 633 (1959), does not appear to have the capability of operating with three phases. Moreover, co-current flow takes place in their apparatus. With reference to FIG. 2 of the referenced article, placement of tube H as they have indicated necessitates co-current flow of the lighter phase with the heavier phase because in the sequence of rotation the lighter phase will contact tube H and some of it will be trapped above the heavier phase as the rotation continues until decantation by tube L. On continued rotation, the heavier phase will push the small amount of lighter phase trapped in tube H into the mixer-settler stage M'. The Wilhelm and Foos device is also similar to that of Alderweireldt as described in his article referenced above.

SUMMARY OF THE INVENTION

Accordingly, it is an object of the present invention to provide a device for mixing and then separating three immiscible or semi-immiscible liquids using tube elements which are adapted to be arranged in a parallel bank.

Moreover, it is an object of the present invention to provide such a device in which co-current flow is eliminated.

These, as well as other objects of the invention, may be met by a tube element adapted for interconnection in a rotatable array of such elements to implement the mixing and subsequent separation of three at least semi-immiscible liquids into light, intermediate and heavy phases including an elongated hollow mixing tube closed at a lower end, a first elongated hollow decanting tube shorter than the mixing tube and disposed spaced from and parallel to the mixing tube with upper ends of mixing tube and the first decanting tube at substantially the same level, a first fluid communicating juncture tube coupling the upper ends of the mixing and decanting tubes, a second elongated hollow decanting tube shorter than the mixing tube and disposed between the first decanting tube and the mixing tube, a second fluid communicating juncture tube coupling the upper end of the second decanting tube to the first decanting tube at the juncture between the first decanting tube and the first juncture tube, a first elongated downspout tube sealingly mounted in the lower end of the first decanting tube and extending upwards therein a first pre-determined distance for defining the volume of the lower and intermediate phases, a second elongated downspout tube sealingly mounted in the lower end of the second decanting tube and extending upwards therein a second pre-determined distance for defining the volume of the lower phase, a first transfer tube coupled at one end to the first down spout tube and adapted to be coupled at its other end to a lower portion of a mixing tube of another element or one side of the element in the array, and a second transfer tube coupled one end to the second down spout tube and adapted to be coupled at its other end to a lower portion of the mixing tube of another or third element on another, opposite side of the array. As used herein, "lower", "upper" and the like are used simply as a matter of convenience in describing one of the inventive tube elements, and refer to the tube element only in one orientation. The element may, of course be rotated to other positions.

A distending volume element may be provided coupled to the first juncture tube. A threaded portion and a removable cap mating with the threaded portion may be provided either on the lower end of the mixing tube or at the outwardly extending end portion of the distending volume element for filling and emptying the device. In preferred embodiments, the first and second transfer tubes extend downwards from the first and second downspout tubes. Also, a lip may be provided above the juncture between the first decanting tube and second juncture tube and below the first juncture tube to appropriately guide the flow of the liquids.

In carrying out the invention, a pre-determined number of the inventive tube elements may be arranged in a bank parallel with one another and interconnected in the manner described. Means are provided for rotating the bank of elements in accordance with a disclosed procedure for carrying out the mixing and subsequent separation procedure.

BRIEF DESCRIPTION OF THE DRAWINGS

FIGS. 3–13 are a series of cross-sectional views showing a tube element at various rotational angles during a complete cycle illustrating the operation of a tube element of the invention.

DESCRIPTION OF THE PREFERRED EMBODIMENTS

Figure 1:
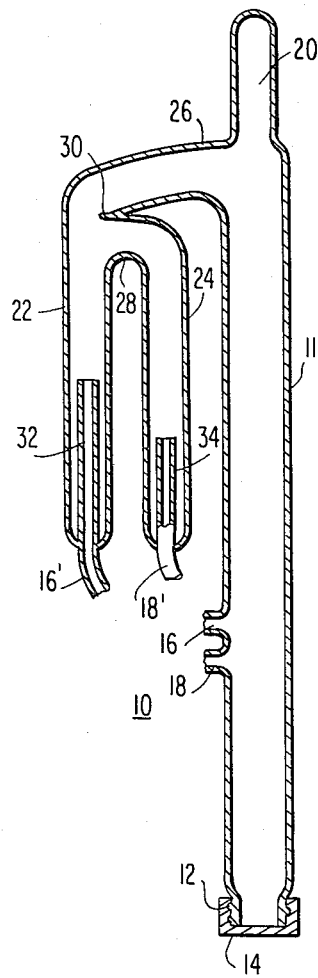
FIG. 1 is a cross-section taken through a tube element of the invention.

Referring first to FIG. 1 there is shown therein a cross-section of a tube element constructed in accordance with the teachings of the invention. The element includes an elongated glass mixing tube 11 which is closed at its lower end by a cap 14 which may be screwed onto threaded portion 12 at the lower end of mixing tube 11. Disposed parallel with mixing tube 11 are light phase decant tube 22 and intermediate phase decant tube 24. The upper end of light phase decant tube 22, which is substantially at the same level as the upper end of mixing tube 11, is joined with mixing tube 11 by a juncture tube 26 oriented horizontally therebetween. Intermediate phase decant tube 24 is joined to light phase decant tube 22 by way of a second juncture tube 28. Second juncture tube 28 is oriented substantially horizontally and meets the upper portion of light phase decant tube 22 below the point where it joins with first juncture tube 26. A lip 30 may be provided extending horizontally outward from the lower surface of first juncture tube 26 into a portion of light phase decant tube 22. Also, a distending volume element 20 may extend outwards from the upper side of first juncture tube 26. The functions of lip 30 and distending volume element 20 will also be made apparent in the following discussion. As shown in the view of FIG. 1, the end of distending volume element 20 is closed wholly with glass. Alternatively, the upper end of distending volume element 20 can be threaded and a cap attached thereto in the same fashion as the lower end of mixing tube 11. This permits the filling and emptying of the device through this end which is advantageous in a complete array.

A light phase downspout tube 32 extends upwards from a sealed joint with the lower end of light phase decant tube 22 co-axial therewith to a distance so that the fluid volume of the annular space between light phase decant tube 22 and downspout tube 32 is equal to the volume of the sum of the volumes of the lower and intermediate phases. Similarly, a second or intermediate phase downspout tube extends upwards from a sealed connection with the lower end of intermediate phase decant tube 24 co-axial therewith to a distance such that the annular volume between it and the inner surface of intermediate phase decant tube 24 is equal to the volume of only the lower phase.

Figure 2:
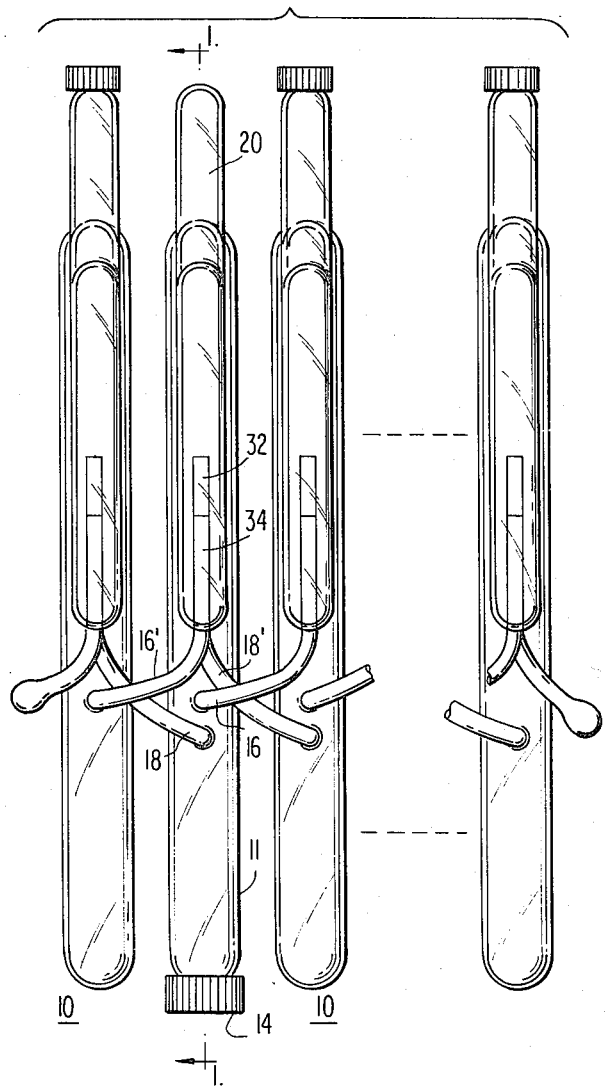
FIG. 2 is a front view of a bank or array of the tube elements of the invention showing the tube interconnections.

Referring next to the plan view of FIG. 2, there is shown an interconnected bank or array of the tube elements of the invention. For example, ten tube elements may be arranged in an array and interconnected as shown. Within the array, each light phase downspout tube is connected to a light phase transfer tube 16. Each light phase transfer tube 16 is connected to the lower portion of the mixing tube on the immediate left within the array. Similarly, each intermediate phase downspout tube 34 is connected through an intermediate or second transfer tube 18 to the lower portion of the mixing tube of the element on the immediate right within the array. Screw-on caps 14 are alternated between ends of mixing tubes 11 and distended volume elements 20. Preferably, the various transfer tubes extend downwards from their corresponding downspout tubes. The ends of the outwardly extending transfer tubes on the two elements at the far ends of the array are open in order to permit flow of the fluid from one train either into the collection vessels or to the next train of the array either in front or behind the described array. A ball and socket joint, not shown, may be used to implement the connection to either the next array or to a collection apparatus. Similarily, the mixing tube connections for the intermediate and light phases may be ball and socket joints to the next array or appropriate filling apparatus. These ball and socket joints are so arranged to permit the light phase to be transferred to the next array of tubes in front and the intermediate phase transferred to the next array behind, or vice versa.

Figure 3:
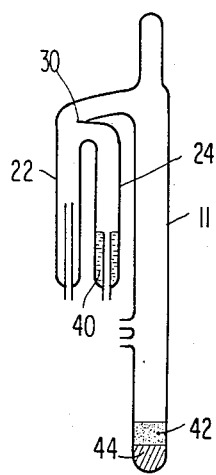

With reference to the cross-sectional view of FIGS. 3-13, the operation of the tube elements and the tube element arrays of the invention will now be described. As shown in FIG. 3, the tube element is in the upright position at the start of the cycle. At this point, the lower phase 40 rests within the bottom portion of intermediate phase decant tube 24 below the upper lip of intermediate phase down spout tube 34. The intermediate phase 44 rests at the bottom of mixing tube 11 while light phase 42 floats above it.

Figure 4:
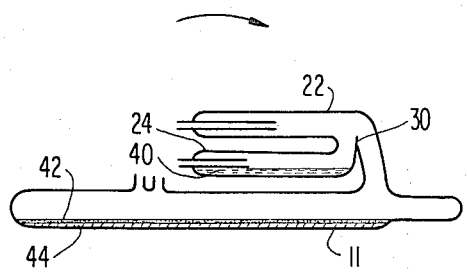
Figure 5:
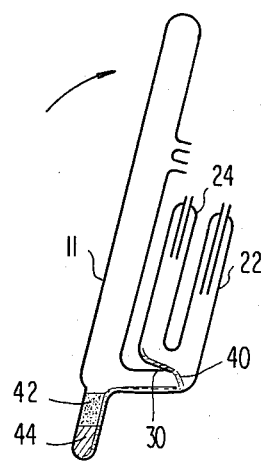

Next, the array is rotated clockwise from the position shown in FIG. 3 to that shown in FIG. 4. Here, the lower phase and the two mobile phases, that is the intermediate and light phases, have moved into the mixing position within mixing tube 11. Rotation is not halted at this point but is carried on continuously until the tube element arrives at the position shown in FIG. 5 wherein intermediate phase 44 and light phase 42 have been transferred to distended volume element 20 at the top of mixing tube 11 and with lower phase 40 being directed by lip 30 to the upper surface of first juncture tube 26 to permit it to flow along the left-hand surface of distending volume element 20 where it rests in distended volume element 20 underneath intermediate phase 44. Rotation is halted at this point to permit the draining of the lower phase into distended volume element 20 as shown in FIG. 6 wherein the lower phase has been completely decanted into the two mobile phases.

The tube is again rotated counter-clockwise until the three phases are positioned atop one another in mixing tube 11. The tube is rocked back and forth by alternative clockwise and counter-clockwise rotation through a small angle to mix the three phases as shown in the view of FIG. 8. Efficient interchange of material between the three phases takes place across the large interface area of each phase exposed to one another resulting from performing the mixing operation lengthwise along mixing tube 11.

Following the mixing operation, the array is rotated clockwise towards the position shown in FIG. 9 to position the three phases in the light phase decant tube. Rotation is halted in this position to allow the three phases to settle. Following settling, the bank and element is rotated 90° clockwise and stopped in the vertical or upright position of FIG. 10 to allow the light phase to decant through transfer tube 16' to the adjacent element in the bank to the left. Also as shown in FIG. 9, the light phase enters from the element to the right through light phase transfer tube 16 entering mixing tube 11. Intermediate phase 44 and lower phase 40 remain within light phase decant tube 22. Because the annular volume surrounding light phase down spout tube 32 is equal to the combined volumes of the intermediate and lower phases, the entire light phase is decanted and separated from the intermediate and lower phases at this point and without co-current flow.

After the light phase has been decanted, the array is rotated 90° clockwise to move lower phase 40 and intermediate phase 44 into intermediate phase decant tube 24. The tube bank is stopped in this position. As shown in FIG. 12, intermediate phase 44 and lower phase 40 are allowed to settle into their respective fluid positions according to their densities.

Finally, the element and tube bank is rotated counter-clockwise to the position of FIG. 13 to decant into intermediate phase 44 through intermediate phase downspout tube 34 and intermediate phase transfer tube 18' to the tube element within the array to the immediate right. The intermediate phase from the tube element to the immediate left enters the tube shown in FIG. 13 through intermediate phase transfer tube 18. The apparatus has now completed one cycle and is back to the initial position shown in FIG. 3.

It may easily be appreciated at this point that the intermediate phase moves through the array to the right as the apparatus proceeds through multiple cycles while the light phase moves through the array to the left. The lower phase remains stationary. After the apparatus has completed a number of cycles corresponding to the number of tubes in the bank, the three phases can be separately removed.

The apparatus of the invention is also adaptable for carrying out substantially conventional counter-current fractionation in which either of the mobile phases is retained for mixing. This is equivalent to performing the described operation but with two lower or stationary phases and one mobil phase. To accomplish this, operationally, if the sequence of operations is halted in the position shown in FIG. 12 and the tube array rotated clockwise, the fluid will assume the position shown in FIG. 4. At that point, the intermediate phase and stationary lower phase will mix with a new light phase.

If desired, the intermediate phase can be left out completely and only a single heavy stationary phase used with a light phase thereby emulating standard countercurrent fractionation. In particularly, this represents a distinct advantage over the device disclosed by Buchler. In his device it is not possible to sequence the light or intermediate phases because there is no convenient way of returning either fluid to his container 11 to recontact phase one. Thus, in Buchler's device, it does not appear possible to retain either of the mobile phases for mixing to carry out such conventional counter-current fractionation.

Other variations of the invention are possible. Banks of parallel tube elements can be interconnected in a stacked system having multiple rows. This arrangement can be used to further compact the space required to perform a particular mixing and separating operation.

As can readily be appreciated by the discussion above and the accompanying diagrams, 3-phase counter-current distribution is effectuated with the system of the invention while entirely eliminating the possibility of undesirable co-current flow of the various phases.

This completes the description of the preferred embodiments of the invention. Although preferred embodiments have been described, it is believed that numerous modifications and alterations thereto would be apparent to one having ordinary skill in the art without departing from the spirit and scope of the invention.

What is claimed is:

1. A tube element adapted for interconnection in a rotatable array of such elements to implement mixing and subsequent separation of three at least semi-immiscible liquids into light, intermediate and heavy phases, comprising in combination:
   (a) an elongated hollow mixing tube closed at a lower end;
   (b) a first elongated hollow decanting tube shorter than said mixing tube and disposed spaced from and parallel to said mixing tube with upper ends of said mixing tube and said first decanting tube at substantially the same level;
   (c) a first fluid communicating juncture tube coupling the upper ends of the mixing and decanting tubes;
   (d) a second elongated hollow decanting tube shorter than said mixing tube and disposed between said first decanting tube and said mixing tube;
   (e) a second fluid communicating juncture tube coupling the upper end of said second decanting tube to said first decanting tube at the juncture between said first decanting tube and said first juncture tube;
   (f) a first elongated downspout tube, sealingly mounted in the lower end of said first decanting tube and extending upwards therein a first predetermined distance for defining the volume of the lower and intermediate phases;
   (g) a second elongated downspout tube sealingly mounted in the lower end of said second decanting tube and extending upwards therein a second predetermined distance for defining the volume of the lower phase;
   (h) a first transfer tube coupled at one end to said first downspout tube and adapted to be coupled at its other end to a lower portion of a mixing tube of a tube element on one side in the array; and
   (i) a second transfer tube coupled at one end to said second downspout tube and adapted to be coupled at its other end to a lower portion of a mixing tube of a tube element on another, opposite side in the array.

2. The tube element of claim 1 further comprising a distended volume element coupled to said first juncture tube.

3. The tube element of claim 2 wherein one of said lower end of said mixing tube and the outwardly extending end portion of said distended volume element comprises a threaded portion and further comprising a removable cap having threads mating with said threaded portion for closing said lower end.

4. The tube element of claim 2 wherein both said first and second transfer tubes slope downwards from said first and second downspout tubes.

5. The tube element of any of claims 1–4 further comprising a lip above the juncture between said first decanting tube and said second juncture tube and below said first juncture tube.

6. An array of tube elements for mixing and separating three at least semi-immiscible liquids comprising a plurality of interconnected tube elements, each of said tube elements comprising:
   (a) an elongated hollow mixing tube closed at a lower end;
   (b) a first elongated hollow decanting tube shorter than said mixing tube and disposed spaced from and parallel to said mixing tube with upper ends of said mixing tube and said first decanting tube at substantially the same level;
   (c) a first fluid communicating juncture tube coupling the upper ends of the mixing and decanting tubes;
   (d) a second elongated hollow decanting tube shorter than said mixing tube and disposed between said first decanting tube and said mixing tube;
   (e) a second fluid communicating juncture tube coupling the upper end of said second decanting tube to said first decanting tube at the juncture between said first decanting tube and said first juncture tube;
   (f) a first elongated downspout tube, sealingly mounted in the lower end of said first decanting tube and extending upwards therein a first predetermined distance for defining the volume of the lower and intermediate phases;
   (g) a second elongated downspout tube sealingly mounted in the lower end of said second decanting tube and extending upwards therein a second predetermined distance for defining the volume of the lower phase;
   (h) a first transfer tube coupled at one end to said first downspout tube and adapted to be coupled at its other end to a lower portion of a mixing tube of the tube element on one side in the array; and
   (i) a second transfer tube coupled at one end to said second downspout tube and adapted to be coupled at its other end to a lower portion of a mixing tube of the tube element on another, opposite side in the array.

7. The tube element of claim 6 further comprising a distended volume element coupled to said first juncture tube.

8. The tube element of claim 7 wherein one of said lower end of said mixing tube and the outwardly extending end portion of said distended volume element comprises a threaded portion and further comprising a removable cap having threads mating with said threaded portion for closing said lower end.

9. The tube element of claim 7 wherein both said first and second transfer tubes slope downwards from said first and second downspout tubes.

10. The tube element of any of claims 6–9 further comprising a lip above the juncture between said first decanting tube and said second juncture tube and below said first juncture tube.

* * * * *